United States Patent [19]

Van Atta et al.

[11] 4,225,883
[45] Sep. 30, 1980

[54] AUTOMATIC RESPONSIVITY COMPENSATOR IN AN IR IMAGING SYSTEM

[75] Inventors: Peter W. Van Atta, Woodbridge; Max L. Harwell, Alexandria, both of Va.

[73] Assignee: The United States of America as represented by the Secretary of the Army, Washington, D.C.

[21] Appl. No.: 47,430

[22] Filed: Jun. 11, 1979

[51] Int. Cl.³ .............................................. H04N 7/18
[52] U.S. Cl. .................................. 358/113; 250/334; 250/338; 358/213
[58] Field of Search .................. 358/113, 213, 293; 250/334, 338

[56] References Cited

U.S. PATENT DOCUMENTS

| | | | |
|---|---|---|---|
| 3,886,359 | 5/1975 | Cheek | 358/113 |
| 3,971,886 | 7/1976 | Chow | 358/113 |
| 4,032,975 | 6/1977 | Malueg | 358/213 |

Primary Examiner—Howard W. Britton
Attorney, Agent, or Firm—Nathan Edelberg; Robert P. Gibson; Max L. Harwell

[57] ABSTRACT

An automatic responsivity compensator for correcting video output signals from a CCD multiplexer in a cryogenic dewar in IR imaging systems wherein the CCD multiplexer must operate with fixed gain inputs from a plurality of linear detector channels. The automatic responsivity compensator is comprised of a signal reference that is normalized with what the output voltage should be when looking at a fixed temperature source in the field of view of the detectors and which further provides a voltage reference for automatic gain adjustment for each detector channel to normalize and equalize the responsivity of the detectors. The automatic responsivity compensator may be either a feedback system as a direct gain control means of a controllable gain amplifier or may be a feedback system operating on the output from a constant gain amplifier wherein either feedback system equalizes the responsivity of the detectors.

7 Claims, 2 Drawing Figures

AUTOMATIC RESPONSIVITY COMPENSATOR IN AN IR IMAGING SYSTEM

The invention described herein may be manufactured, used and licensed by the U.S. Government for governmental purposes without the payment of any royalties thereon.

BACKGROUND OF THE INVENTION

The general field of technology of the present invention is in signal processing of multiplexed far infrared (IR) imaging systems.

One approach to far infrared imaging systems is to use a linear array of detectors coupled through buffer amplifiers to a time division multiplexer to produce a serial output corresponding to scanning the detectors along the array. A combination of optical scan in one direction and electronic scan in the other produces raster scene scan. A cathode ray tube readout may then be coupled and synchronized to produce a visible raster picture.

Recently, time division multiplexers have been constructed using charge coupled devices (CCDs). These devices can operate at low temperatures making multiplexing inside the detector dewar possible. However, the response of an array of detectors to a given input signal varies from detector to detector. This response variance requires that the gain associated with each channel be changed to normalize the outputs prior to multiplexing. This is usually done in the buffer amplifiers. In systems where the multiplexer must operate with fixed gain inputs such as a monolithic CCD device in the dewar, it is not possible to set each gain individually nor to perform automatic responsivity equalization. To make multiplexing in the dewar practical some means of equalizing the serial output must be used. The present invention accomplishes equalization of the serial output.

SUMMARY OF THE INVENTION

The present invention overcomes the disadvantages of prior art IR imagers by providing an automatic gain adjustment for each detector channel to equalize responsivity. The present automatic responsivity compensator operates on the serial output from the multiplexer and therefor is achieved outside the cryogenic dewar. Since the operation is automatic, individual controls for each detector channel are not needed and drift may be compensated automatically on each scan.

The automatic responsivity compensator is connected at the output of the multiplexer for equalizing the output voltages therefrom. The compensator is comprised of a gain amplifier that provides an active signal therefrom and a divider having as one input a signal reference which corresponds to the desired overall output signal level of the gain amplifier for a nominal responsivity of the detector array and as a second input the active signal from the gain amplifier. The signal reference is always divided by the active signal in the divider. If there is a difference between the signal reference and the active output signal, a correction signal close to unity will be generated from the divider. Otherwise, if both are equal, a unity correction signal is generated. It should be noted that there is an established correction signal of some voltage value for each of all the detector channels that are multiplexed out into the gain amplifier. If the correction signal is other than unity, the correction signal will be on the opposite side of unity than what the active signal is from the signal reference, i.e. if the active signal is higher than the signal reference, the correction signal will be less than unity, but if the active signal is less than the signal reference, the correction signal will be above unity. The simple mathematical explanation is that the division always has the dividend as a constant, representing the constant signal reference, with the divisor as a variable, representing the variable active signal. Thus, if the active signal is more than the signal reference, a division would result in a correction signal less than unity, or vice versa.

Each of the established correction signals that are generated by the divider are serially gated into a CCD serial analog memory and are stored therein. The correction signals are sequenced out of the CCD serial analog memory to either directly control the gain bias of a controllable gain amplifier in one embodiment of this invention, or as in another embodiment to indirectly operate on the output signal from a constant gain amplifier by being multiplied with the active output signal from the constant gain amplifier in an analog multiplier.

The established correction signal for each detector channel are also constantly sequenced out of the CCD serial analog memory back to its input for recirculation therethrough. The established correction signal for each detector channel operates on the gain amplifier to provide automatic gain control to normalize subsequent readout of their respective detector channels.

In reference to far infrared detectors, such as mercury-cadmium-telluride (HgCdTe) or lead-tin-telluride (PbSnTe), the output is not commensurate with the input thereto, with variation therebetween of up to 20%. The present automatic responsivity compensator functions to equalize the output voltages from such detectors. In the IR imaging systems in which the present automatic responsivity compensator is used, during scan dead time the detectors look at a fixed temperature source and the multiplexer scans all of the detectors sequentially. If the output voltage varies from the ideal as represented by the fixed temperature source, correction signals are generated out of the divider as discussed herein above. Each IR imaging system is first laboratory tested for the sensitivity and temperature responsivity of the detectors to determine what value the active signals, or output signal, from the gain amplifier should be for a nominal signal therefrom. The signal reference should then be set at this nominal value to maintain the automatic responsivity.

The invention will be better understood with reference to the detailed description herein below with reference to the following drawings.

DETAILED DESCRIPTION OF THE PREFERRED EMBODIMENT

Figure 1:
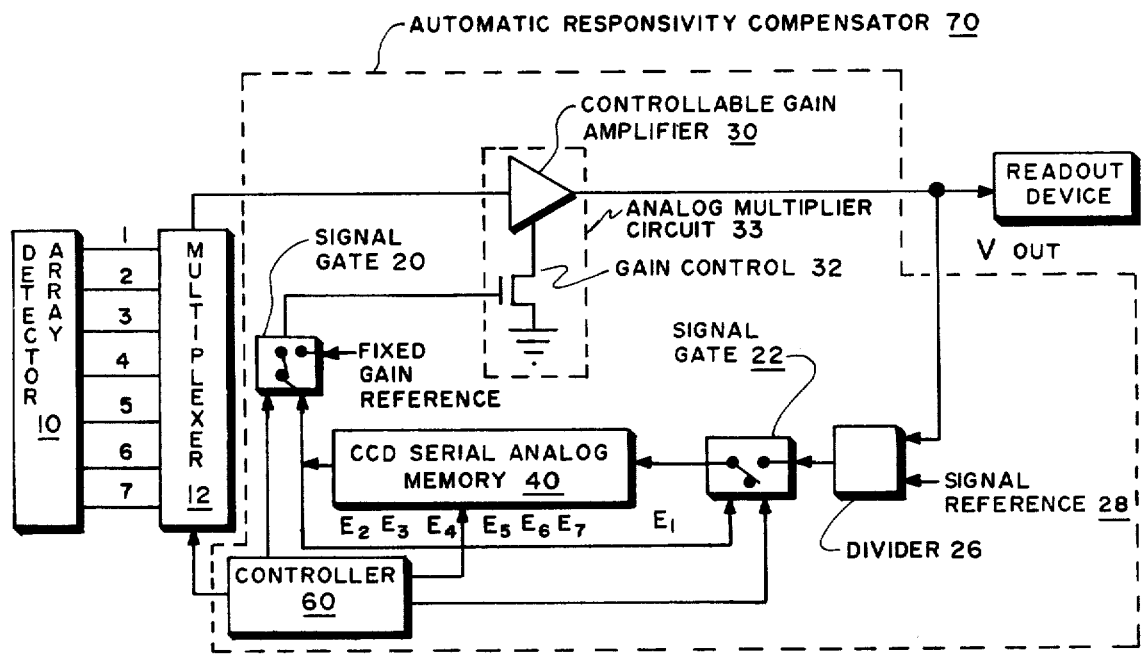
FIG. 1 illustrates in block diagram form one embodiment of the present invention.

Referring to FIG. 1, a detector array 10 is shown having seven representative linear detector channels therefrom which are scanned, or multiplexed, by a charge coupled device (CCD) time division multiplexer 12. The detector array 10 and multiplexer 12 are both enclosed within a cryogenic dewar (not shown).

In this type IR imaging system where the multiplexer must operate with fixed gain inputs in accordance with a fixed temperature source, such as a fixed temperature bar or the case of the IR imager, that the detectors are exposed to at the end of each scan, some means of equalizing the serial output from the multiplexer 12 is needed. The present automatic responsivity compensator provides automatic gain adjustment for each detector channel to equalize responsivity. Automatic responsivity compensator conveniently operates outside the cryogenic dewar.

The detectors of the detector array 10 have their field of view scanned by some optical means (not shown since that is not a part of the present invention). Each detector produces electrical signals therefrom according to the thermal changes in the scene as viewed by the detectors, and also due to the detectors responsivity. Multiplexer 12 electrically scans the signal inputs, from the detector channels, represented by numerals 1 through 7, according to clock signals from a controller 60, and produces serial output signals of the vertical linear detector channels.

The serial channel output signals are initially amplified by controllable gain amplifier 30. The output signal, herein referred to as the active signal, from amplifier 30 is applied to one input of a divider 26 within the automatic responsivity compensator 70. A signal reference 28, having a voltage value corresponding to the normalized output voltage $V_{out}$, is applied to a second input to divider 26. If there is a difference between the active, or original, signal and the signal reference 27, the divider 26 produces a correction signal at its output. A controller 60 that controls the overall operation of the automatic responsivity compensator gates the correction signal through the closed side of a single-pole, double-throw switch of first signal gate 22, into the CCD serial analog memory 40. While a complete series of correction signals $E_1$ through $E_7$ is stored in memory, second signal gate 20 has a single-pole, double-throw switch therein that connects a fixed gain reference to the controllable gain amplifier 30 so that gain amplifier 30 continues to operate in an originally biased condition for fixed gain. Controller 60 also controls the operation of gate 20 along with the CCD multiplexer 12 and memory 40 simultaneously so that all the channels 1 through 7 of the linear detectors are clocked out of the multiplexer 12 and the corresponding correction signals $E_1$ through $E_7$ for each channel are clocked into memory 40 in a sequential manner wherein the correction signals are serially stored in the memory 40. Look at FIG. 1 more closely for an explanation of the operation of the automatic responsivity compensator after correction signals $E_1$ through $E_7$ have been stored in memory 40. Along the memory 40 block is shown the symbolic stored correction signals, represented as $E_2$ through $E_7$, with correction signals $E_1$ shown as being fed out of memory 40 back through first signal gate 22 into memory 40. It should be noted here that after $E_1$ through $E_7$ correction signals have been stored in memory 40, the single-pole, double-throw switch of first signal gate 22 isolates the output of divider 26 from memory 40 so that correction signals are no longer fed into memory 40. The established signals $E_1$ through $E_7$ are however constantly recirculated through memory 40. While $E_1$ is being reentered in memory 40 through gate 22, the single-pole, double-throw switch in second signal gate 20 is closed by controller 60 and signal $E_1$ is applied to the base of a gain control circuit 32. Circuit 32 may be a field-effect-transistor (FET) of either the depletion or enhancement modes, and is preferably a normally partially conductive depletion mode n-type channel, but may be p-type as well. The above sequence of circulating the $E_1$ correction signal is taking place while channel 1 is being multiplexed into the controllable gain amplifier 30. Any gain control that is needed because of the previously stored readout signal intensity from channel 1 being different from the signal reference 28 is applied to amplifier 30 to return the output voltage $V_{out}$ to a normalized value equal to the signal reference 28. Specifically, if the immediately previous readout signal intensity from channel 1 was higher than the signal reference 28 then subsequent readouts from channel 1 would be lowered in accordance with the active signal herein divided into signal reference 28, which is at a constant value that is lower, thus obtaining a correction signal less than unity that is applied to the base of the FET of gain control 32. In other words, the gain of 30 is operated on in accordance with the analog voltage level in memory 40 as established by the generated correction signals. Controllable gain amplifier 30 and gain control 32 form an analog multiplier circuit 33.

The above sequence is continuous with serially switched signals $E_1$ through $E_7$, representative of the total number of detector channels operated on, being constantly recirculated through memory 40 and applied to the base of the FET in circuit 32. The readout of correction signals $E_1$ through $E_7$ from memory 40 are synchronized by controller 60 to be applied respectively to the base of the FET at the exact time that the multiplexer is being controlled by controller 60 to read out the corresponding detector channels 1 through 7. The FET may be a junction gate FET (JFET), which is always a depletion type, or an insulated gate FET (IGFET), which may be a depletion type. The FET maintains the output voltage $V_{out}$ equivalent to the input from the multiplexer and at a nominal value determined in the laboratory for signal reference 28. The FET being partially conductive and controlled by the voltage applied to its base functions as a variable resistor, i.e. it is originally biased to a certain amount of conduction and varies around that amount by the voltage applied to its base. Memory 40 thus circulates each channel scan line correction signal therethrough, by controller 60 operation, to be ready for controlling the responsibility of the next corresponding scan line. After initial storage of all the sampled scan lines, recirculation is accomplished by opening one side of the single pole, double throw switch in the first signal gate 22 for isolating the divider 26 but having the other side of the single pole, double throw switch remaining closed in gate 22 to pass the recirculated correction signals back into memory 40. It should be noted that the analog memory bits must remain in memory 40 for one frame time. This is a long time by present CCD standards.

Figure 2:
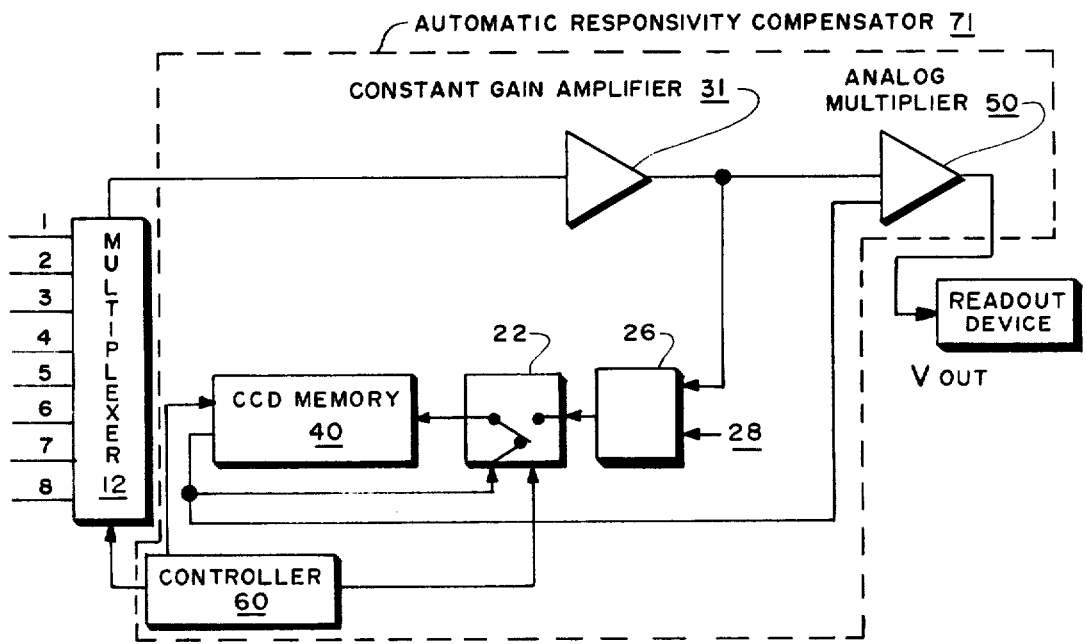
FIG. 2 illustrates a second embodiment of the present invention.

FIG. 2 illustrates an alternate type of automatic responsivity compensator 71. In this embodiment, the analog correction signal directly corrects the output from a constant gain amplifier 31 by multiplying this output with the correction signal generated by divider 26 in analog multiplier 50. The constant gain amplifier 31 has an active output signal therefrom that is applied to the first input of the divider 26, the same as in the embodiment shown by FIG. 1, but also applies the active signal to one input of the analog multiplier 50 for multiplication with the corresponding correction signal from memory 40 for the same channel. During the time that one of the correction signals, say for example correction signal $E_1$, is being recirculated and reentered back into memory 40, the correction signal $E_1$, is also applied as the second input to 50 and is being multiplied with the active signal from detector channel 1 out of the constant gain amplifier 31. Analog multiplier 50 operates to lower an active signal from amplifier 31 that is too high or to raise an active signal from amplifier 31 that is too low since divider 26 produces a correction signal that is on the opposite side of unity in accordance to whether the active signal is above or below the laboratory determined amount of signal reference 28. In this embodiment, controller 60 synchronizes the multiplexing out of each of the particular detector channels from multiplexer 12 and through constant gain amplifier 31 to one input of analog multiplier 50 to the application of the established correction signal generated by the same detector channel on the memory storage scan at a second input to the analog multiplier 50.

We claim:

1. In an IR imaging system having a detector array and a CCD multiplexer in a cryogenic dewar wherein said CCD multiplexer operates with fixed gain input signals from a plurality of linear detector channels of said detector array and wherein the video output signals from said multiplexer are equalized by an automatic responsivity compensator outside said cryogenic dewar which provides automatic gain adjustment for each of the multiplexed fixed gain input signals from each of said plurality of linear detector channels, wherein said automatic responsivity compensator is comprised of:
 a gain amplifier for receiving and amplifying the serially multiplexed video output signals from each linear detector channel;
 a divider having first and second inputs thereto in which said first input has a signal reference applied thereto and said second input has the active signal from the gain amplifier applied thereto wherein said signal reference is normalized to the desired output signal level of said gain amplifier for nominal responsivity of said detector array when looking at a fixed temperature source in the field of view of the detectors and provides a voltage reference for automatic gain adjustment of said gain amplifier for each of said plurality of linear detector channels to normalize and equalize the responsivity of the detectors whereby the constant signal reference is divided by the variable active signal resulting with a plurality of established correction signals for each of said plurality of linear detector channels being generated at the output of said divider in which said correction signals are close to unity and on the opposite side of unity from what the active signal is from the signal reference;
 a gating means;
 a CCD serial analog memory having a complete series of said plurality of established correction signals representing one frame of said plurality of linear detector channels serially gated into and stored therein by said gating means, said gating means isolating the output of said CCD serial analog memory while said complete series of the plurality of established correction signals are stored therein and isolating the input of said CCD serial analog memory from the output of said divider after said plurality of establish correction signals are stored therein; and
 a controller that synchronously clocks the operation of said CCD multiplexer and said CCD serial analog memory along with said gating means to multiplex each of the detector channels of said video output signals from said plurality of linear detector channels simultaneously with the gating of each of the corresponding plurality of established correction signals out of said CCD serial analog memory to said gain amplifier to automatically regulate the gain and output voltage of said gain amplifier in accordance with each of said plurality of established correction signals for each of identical detector channels of said plurality of linear detector channels whereby said plurality of established correction signals are continuously reentered at the input of said serial analog memory and are recirculated therethrough to simultaneously appear at the output thereof to continuously automatically regulate the gain and output voltage of said gain amplifier.

2. An automatic responsivity compensator in an IR imaging system as set forth in claim 1 wherein said gain amplifier is a controllable gain amplifier comprised in an analog multiplier circuit with a gain control FET wherein said FET is base controlled by said plurality of established correction signals and controls the gain of said controllable gain amplifier to equalize the active output signal therefrom for corresponding detector channels of said plurality of linear detector channels.

3. An automatic responsivity compensator in an IR imaging system as set forth in claim 1 wherein said gain amplifier is a constant gain amplifier whose output active signal is applied to one input of an analog multiplier wherein said established correction signal from said CCD serial analog memory is applied as a second input to said analog multiplier whereby said output active signal and said established correction signal are multiplied together to equalize the output signal therefrom for each of said plurality of linear detector channels.

4. An automatic responsivity compensator in an IR imaging system as set forth in claim 2 wherein said FET is a normally partially conductive depletion mode n-type channel JFET.

5. An automatic responsivity compensator in an IR imaging system as set forth in claim 2 wherein said FET is a normally partially conductive depletion mode IGFET with an n-type channel.

6. An automatic responsivity compensator in an IR imaging system as set forth in claim 2 wherein said FET is a normally partially conductive depletion mode p-type channel JFET.

7. An automatic responsivity compensator in an IR imaging system as set forth in claim 2 wherein said FET is a normally partially conductive depletion mode p-type channel IGFET.

* * * * *